(12) United States Patent
Quay et al.

(10) Patent No.: US 11,946,644 B1
(45) Date of Patent: Apr. 2, 2024

(54) MULTI-POT SWIRL INJECTOR

(71) Applicant: Solar Turbines Incorporated, San Diego, CA (US)

(72) Inventors: Bryan D. Quay, Santee, CA (US); Hanjie Lee, San Diego, CA (US); Rajeshriben Patel, San Diego, CA (US); Robert Fanella, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/129,298

(22) Filed: Mar. 31, 2023

(51) Int. Cl.
*F23R 3/28* (2006.01)
*F02C 7/232* (2006.01)

(52) U.S. Cl.
CPC .............. *F23R 3/286* (2013.01); *F02C 7/232* (2013.01)

(58) Field of Classification Search
CPC ........ F23D 14/02; F23D 14/06; F23D 14/065; F23D 14/08; F23D 14/085; F23D 14/62; F23D 14/64; F23D 2206/10; F23D 2204/00; F23D 2900/00008; F23R 3/12; F23R 3/14; F23R 3/286; F23R 3/343; F23R 3/36; F23R 2900/03343
See application file for complete search history.

(56) References Cited

U.S. PATENT DOCUMENTS

| 6,874,323 | B2 | 4/2005 | Stuttaford | |
|---|---|---|---|---|
| 7,290,504 | B2 | 11/2007 | Lange | |
| 2010/0293956 | A1* | 11/2010 | Nadkarni | F23R 3/286 60/740 |
| 2011/0000214 | A1* | 1/2011 | Helmick | F23R 3/14 60/734 |
| 2012/0073302 | A1* | 3/2012 | Myers | F23R 3/343 239/399 |
| 2013/0086910 | A1* | 4/2013 | Khan | F23R 3/14 60/737 |
| 2013/0232978 | A1* | 9/2013 | Dai | F23R 3/28 60/737 |
| 2017/0284671 | A1* | 10/2017 | Asai | F23R 3/36 |

FOREIGN PATENT DOCUMENTS

| CN | 108625998 A | 10/2018 |
|---|---|---|
| EP | 0187441 B1 | 5/1989 |

* cited by examiner

*Primary Examiner* — Scott J Walthour

(57) ABSTRACT

No known single-stage dry low emissions fuel injectors are capable of effectively operating over all ranges of hydrogen concentrations in hydrogen/natural gas fuel mixtures. Accordingly, a fuel injector is disclosed that is capable of operating in both a premix mode for fuel mixtures with lower hydrogen concentrations and a micromix mode for fuel mixtures with higher hydrogen concentrations. The fuel injector may comprise premix jets near an inlet of the fuel injector, optionally within one or more swirlers, and micromix jets near the outlet of the fuel injector. In the premix mode, fuel with lower hydrogen concentrations is provided to the premix jets, whereas in the micromix mode, fuel with higher hydrogen concentrations is provided to the micromix jets.

19 Claims, 9 Drawing Sheets

MULTI-POT SWIRL INJECTOR

TECHNICAL FIELD

The embodiments described herein are generally directed to fuel injection in a gas turbine engine, and, more particularly, to a multi-pot swirl fuel injector for mixtures of natural gas with hydrogen, pure hydrogen, or pure natural gas, operating with dry low emissions.

BACKGROUND

Climate change is largely the result of carbon dioxide ($CO_2$) emitted by the combustion of fossil fuels. One option for reducing $CO_2$ emissions is to reduce the carbon content of fuels at the source of combustion. Thus, significant research and development have been devoted to combustion systems that operate on hydrogen or mixtures of hydrogen and natural gas.

Dry Low NOx Emission (DLE) lean premixed combustion is one means of reducing the emissions of nitric oxides from land-based gas turbine engines. Unfortunately, DLE fuel injectors are susceptible to flashback when operated with highly volatile fuels, such as those containing hydrogen. The higher reactivity and flame speeds of hydrogen, relative to natural gas, results in flashback when burned in traditional swirl-stabilized DLE combustion systems, especially when hydrogen ($H_2$) concentrations are greater than approximately 60% by volume (% v/v). In particular, flashback occurs when the flame speed is greater than the velocity of the local air-fuel mixture. When this happens, the flame propagates upstream into the fuel injector, until the flame reaches a location at which the velocity of the flame equals the velocity of the air-fuel mixture. This frequently occurs near the fuel injection port where the flame attaches, which can damage the fuel injector.

There are three regimes for the combustion of hydrogen-natural-gas mixtures, defined by the flame speed. Regime I is for mixtures of up to 30% hydrogen, in which case the flame speeds and reactivity are similar to that for pure natural gas. Regime II is for mixtures of between 30% to 70% hydrogen, in which case the flame speeds are rapidly increasing. Regime III is for mixtures of greater than 70% hydrogen, in which case the flame speeds approach that of pure hydrogen.

Typically, there is not a single fuel injector that is capable of adequately operating across all three regimes, from pure natural gas, through mixtures of hydrogen and natural gas, to pure hydrogen. Rather, for a gas turbine engine to operate across all regimes, the fuel injectors need to be swapped in and out of the combustor, depending on the regime.

For example, European Patent No. 0187441 B1 discloses a low nitrogen oxide (NOx) premix burner for use in high-temperature furnaces. However, even if such a burner is capable of burning fuel with high hydrogen concentrations, it requires the burner to have moving parts which would not be feasible in the context of a gas turbine engine.

The present disclosure is directed toward overcoming this and other problems discovered by the inventors.

SUMMARY

In an embodiment, a fuel injector comprises: at least one channel defining a flow path for gas from an inlet to an outlet; a plurality of premix jets configured to inject fuel into the flow path at a position closer to the inlet than to the outlet, wherein the plurality of premix jets is configured to be supplied with a first fuel; and a plurality of micromix jets configured to inject fuel into the flow path at a position closer to the outlet than to the inlet, wherein the plurality of micromix jets is configured to be supplied with a second fuel, wherein the fuel injector is configured to in a premix mode, supply the first fuel to the premix jets, such that the first fuel is injected into the flow path via the plurality of premix jets, while not supplying fuel to the plurality of micromix jets, and in a micromix mode, supply the second fuel to the micromix jets, such that the second fuel is injected into the flow path via the plurality of micromix jets, while not supplying fuel to the plurality of premix jets.

In an embodiment, a fuel injector comprises at least one channel defining a flow path for gas from an inlet to an outlet; at least one swirler within the at least one channel, wherein the at least one swirler comprises a plurality of premix jets configured to inject fuel into the flow path at a position closer to the inlet than to the outlet, wherein the plurality of premix jets is configured to be supplied with a first fuel having less than 70% hydrogen by volume; and a plurality of micromix jets configured to inject fuel into the flow path at a position closer to the outlet than to the inlet, wherein the plurality of micromix jets is configured to be supplied with a second fuel having greater than 50% hydrogen by volume, wherein the fuel injector is configured to in a premix mode, supply the first fuel to the premix jets, such that the first fuel is injected into the flow path via the plurality of premix jets, while not supplying fuel to the plurality of micromix jets, and in a micromix mode, supply the second fuel to the micromix jets, such that the second fuel is injected into the flow path via the plurality of micromix jets, while not supplying fuel to the plurality of premix jets.

In an embodiment, a gas turbine engine comprises: a compressor; a combustor downstream from the compressor, wherein the combustor comprises a plurality of fuel injectors, wherein each of the plurality of fuel injectors comprises a plurality of multi-pot swirl injectors, and wherein each multi-pot swirl injector comprises at least one channel defining a flow path for gas from an inlet to an outlet, a plurality of premix jets configured to inject fuel into the flow path at a position closer to the inlet than to the outlet, wherein the plurality of premix jets is configured to be supplied with a first fuel having less than 70% hydrogen by volume, and a plurality of micromix jets configured to inject fuel into the flow path at a position closer to the outlet than to the inlet, wherein the plurality of micromix jets is configured to be supplied with a second fuel having greater than 50% hydrogen by volume, wherein the multi-pot swirl injector is configured to in a premix mode, supply the first fuel to the premix jets, such that the first fuel is injected into the flow path via the plurality of premix jets, while not supplying fuel to the plurality of micromix jets, and in a micromix mode, supply the second fuel to the micromix jets, such that the second fuel is injected into the flow path via the plurality of micromix jets, while not supplying fuel to the plurality of premix jets; and a turbine downstream from the combustor.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
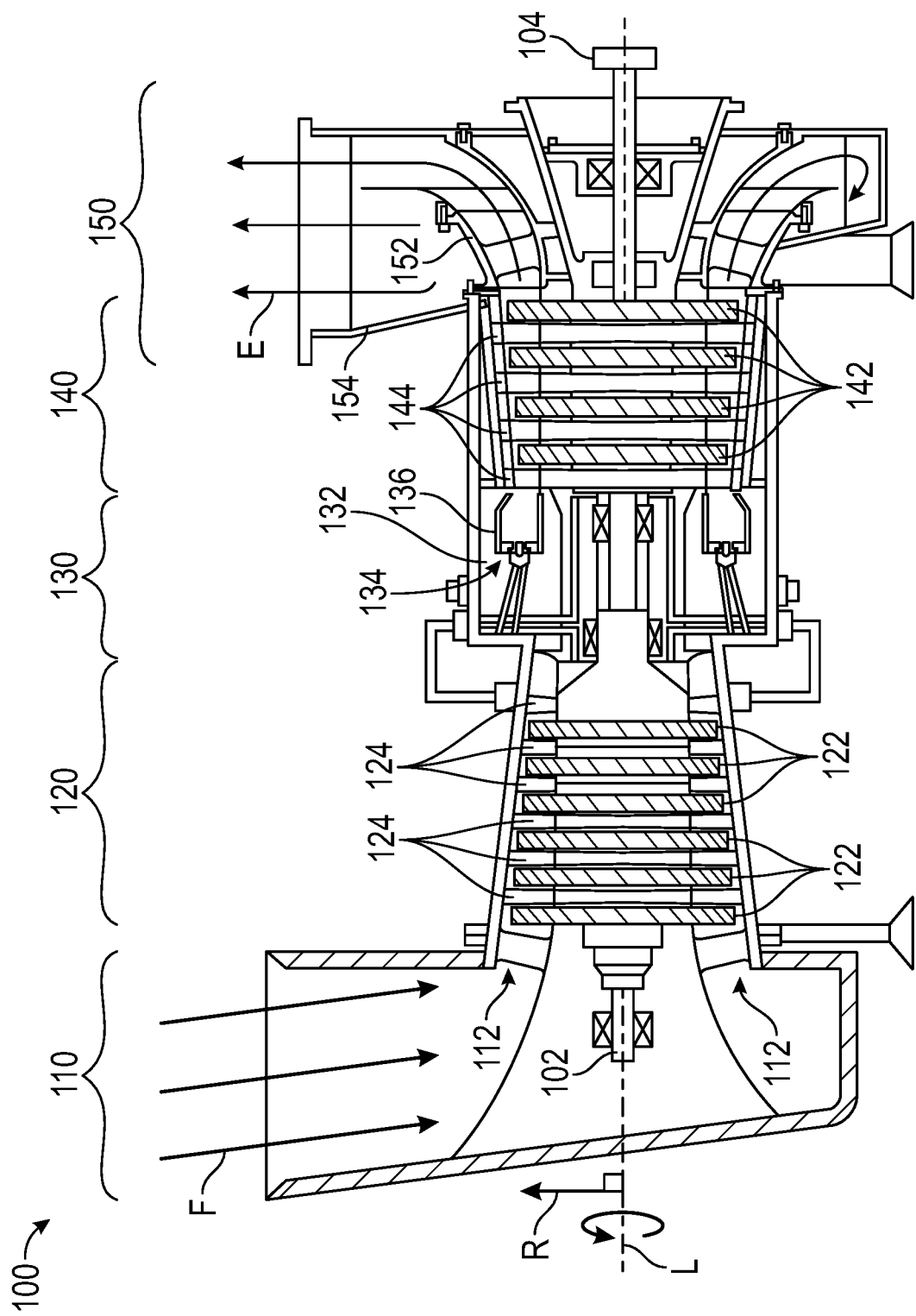
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). As used herein, the term "respective" signifies an association between members of a group of first components and members of a group of second components (e.g., A1 and B1; A2 and B2; . . . AN and BN).

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
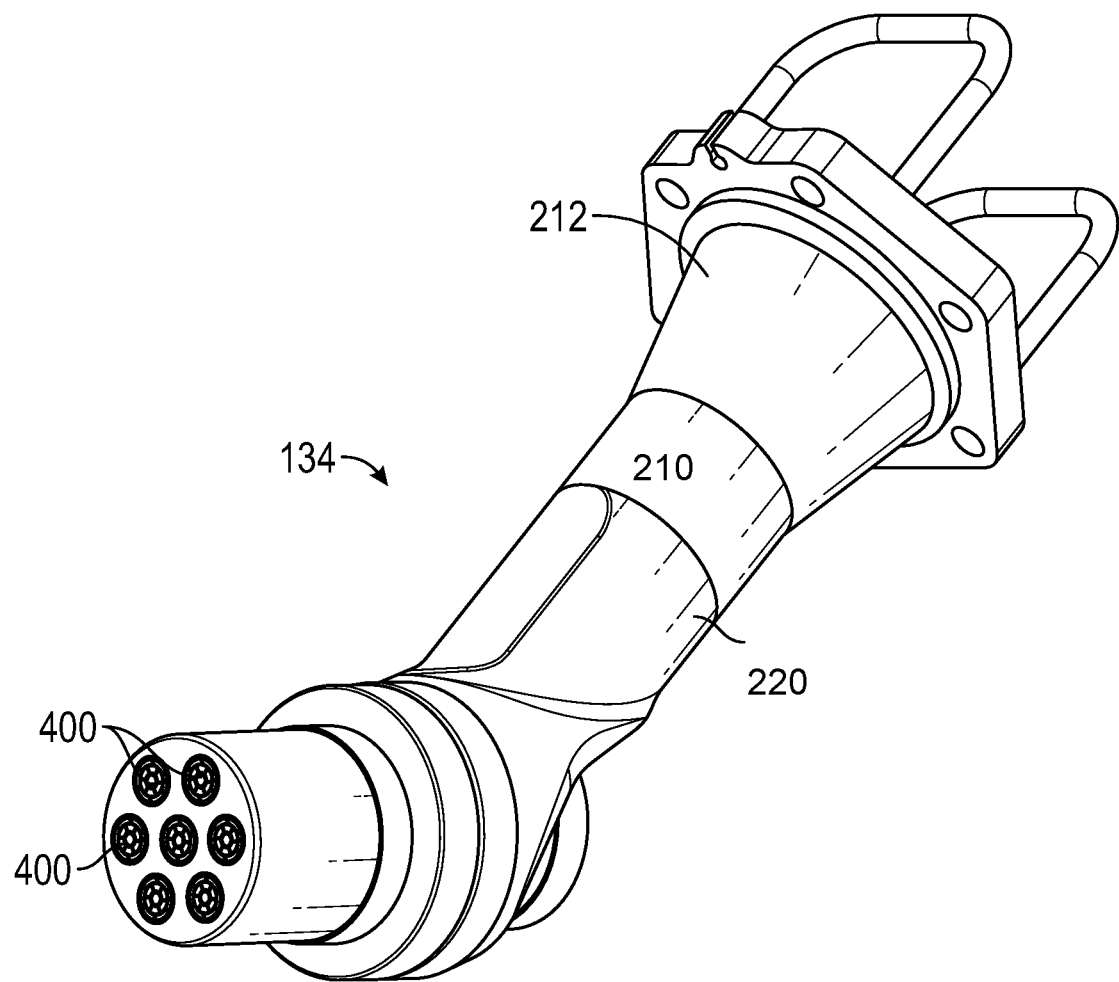
FIG. 2 illustrates a fuel injector, according to an embodiment.

FIG. 2 illustrates a single fuel injector 134 in isolation, according to an embodiment. In the first embodiment, fuel injector 134 comprises an injector arm 210 with an inlet 212 that is connected to a fuel supply and one or more internal channels (not shown) that provide a flow path for the fuel to an injector head 220. In an embodiment, injector arm 210 may comprise at least two inlets that are each connected to distinct internal channels. A first fuel supply system, comprising a first inlet and one or more first internal channels, may supply fuel mixtures in Regime I and II (e.g., up to 70% $H_2$ by volume), which may be referred to herein as low-to-medium hydrogen/natural gas fuel (L-$MH_2$), whereas a second fuel supply system, comprising a second inlet and one or more second internal channels, may supply fuel mixtures from mid-Regime II through Regime III (e.g., greater than 50% $H_2$ by volume), which may be referred to herein as high hydrogen/natural gas fuel ($HH_2$). The first fuel supply system and second fuel supply system may be separate and distinct systems that are each connected to different fuel sources, or may be overlapping systems that switch between different configurations using actuators, switches, valves, and/or the like. In an alternative embodiment, there may be three separate and distinct or overlapping fuel supply systems for fuels of each of Regime I, II, and III. The inlet 212 may also be provided for gas, such as working fluid F (e.g., output by compressor 120), to flow through one or more internal channels (not shown) within injector head 220. The gas and fuel are mixed by one or more multi-pot swirl injectors 400 and burned in combustion chamber 136 during the combustion process in combustor 130.

Figure 3:
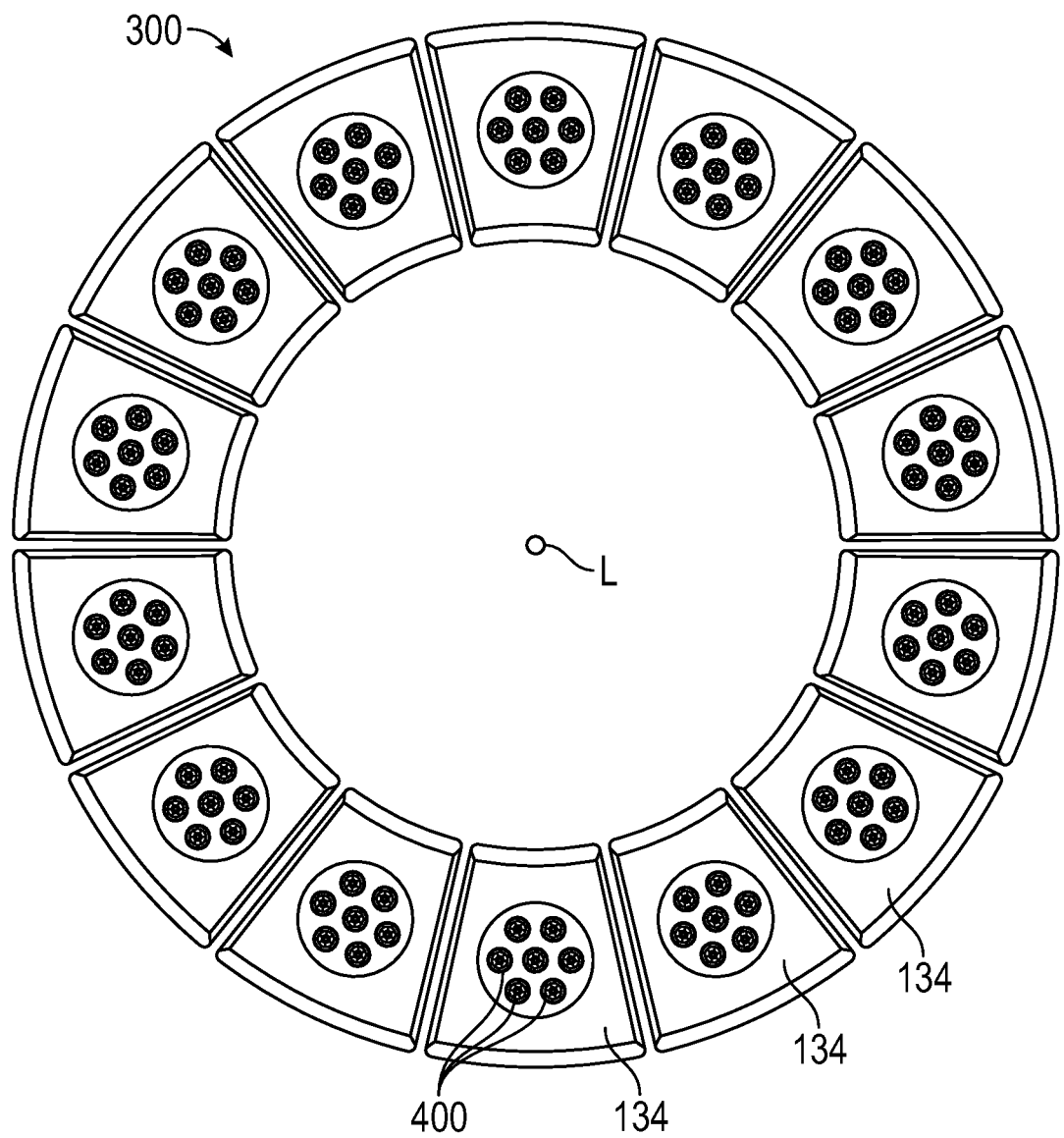
FIG. 3 illustrates an annular fuel injection system, according to an embodiment.

FIG. 3 illustrates an annular fuel injection system 300, according to an alternative embodiment. Fuel injection system 300 is arranged as an annular dome around longitudinal axis L. In this embodiment, fuel injectors 134 are formed as panels representing annulus sectors of fuel injection system 300. These fuel injectors 134 may be held by a frame in a combustion liner dome (not shown) that is annular around longitudinal axis L. Each fuel injector 134 may comprise one or more multi-pot swirl injectors 400, which may be the same as described above. While fourteen fuel injectors 134 are illustrated, the precise number of fuel injectors 134 will depend on the design objectives for a given implementation.

Figure 4:
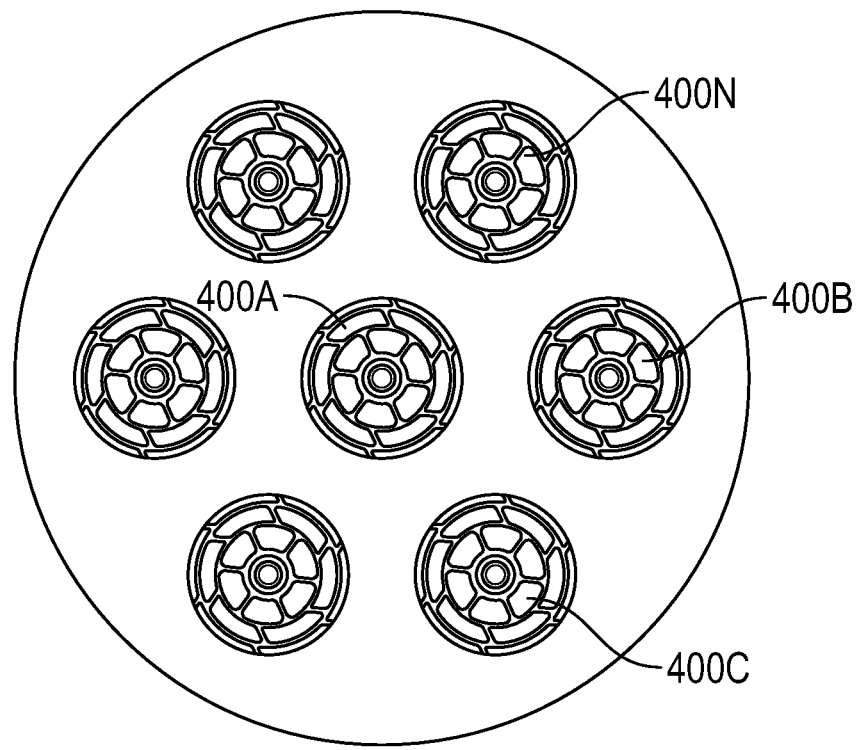
FIG. 4 illustrates an exemplary arrangement of multi-pot swirl injectors, according to an embodiment.

FIG. 4 illustrates an exemplary arrangement of multi-pot swirl injectors 400, according to an embodiment. In this arrangement, there are seven multi-pot swirl injectors 400. One multi-pot swirl injector 400A is positioned in the center, and the remaining six multi-pot swirl injectors 400B, 400C, . . . , 400N encircle central multi-pot swirl injector 400A in a ring, which each encircling multi-pot swirl injector 400B-400N positioned at the vertex of a regular hexagon that is centered at central multi-pot swirl injector 400A. Alternatively, each encircling multi-pot swirl injector 400B-400N could be positioned at the vertex of a regular pentagon that is centered at central multi-pot swirl injector 400A. Seven multi-pot swirl injectors 400 was determined to be well suited for additive manufacturing. However, in an alternative embodiment, an outer ring of twelve more multi-pot swirl injectors 400 may be added to the illustrated arrangement, to produce a fuel injector 134 with nineteen multi-pot swirl injectors 400. More generally, a central multi-pot swirl injector 400A could be positioned in the center of each fuel injector 134, with the other multi-pot swirl injectors 400B-400N encircling the central multi-pot swirl injector 400A in one or more concentric rings. In either embodiment, the central multi-pot swirl injector 400A may be replaced with a pilot that injects pilot fuel into combustion chamber 136.

Figures 5A, 5B:
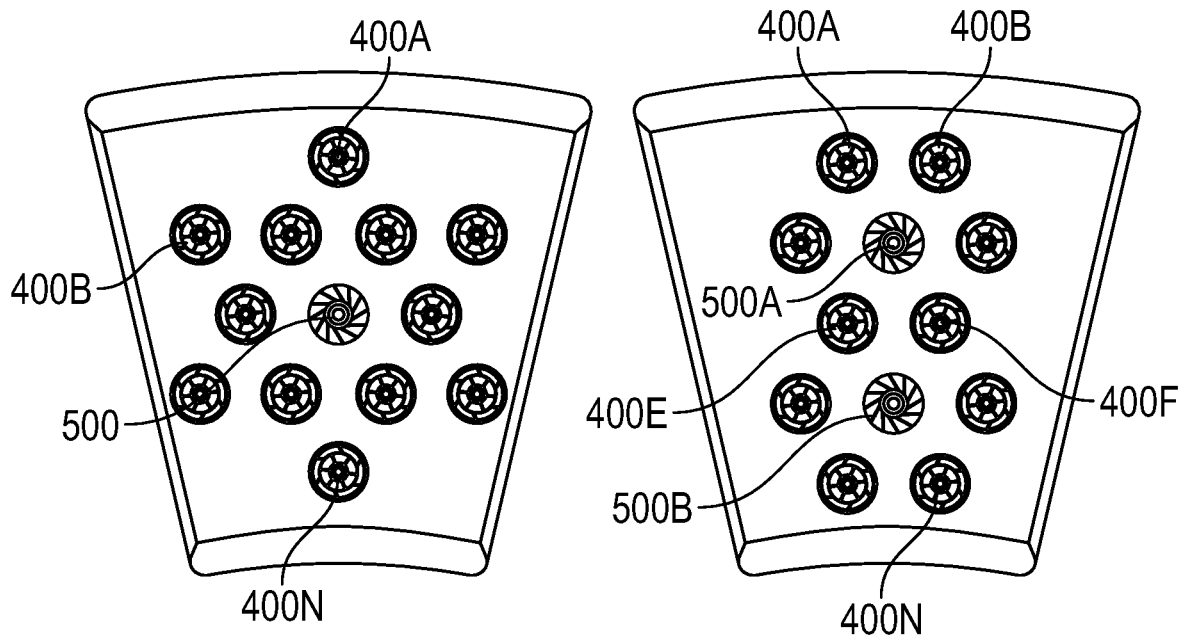
FIGS. 5A and 5B illustrate exemplary arrangements of multi-pot swirl injectors, according to alternative embodiments.

FIGS. 5A and 5B illustrate exemplary arrangements of multi-pot swirl injectors 400, according to alternative embodiments. While these arrangements are illustrated in the context of the panelized fuel injectors 134 of fuel injection system 300, they are not limited to that embodiment. It should be understood that a plurality of multi-pot swirl injectors 400 may be configured into many other arrangements having similar or different shapes than those specifically illustrated, and will depend on the design objectives of a particular implementation. For example, the shape and dimensions of fuel injectors 134 in a particular implementation may define how many multi-pot swirl injectors 400 can be feasibly included and what arrangements are possible.

In the arrangement of FIG. 5A, a plurality of multi-pot swirl injectors 400 are arranged in a star-shaped pattern around a central pilot 500 that is mounted in fuel injector 134 (e.g., a panel of fuel injection system 300). In particular, there is one multi-pot swirl injector 400A on a first row, four multi-pot swirl injectors 400 (e.g., starting with 400B) on a second row, two multi-pot swirl injectors 400 on a third row on either side of a pilot 500 in the center of the third row, four multi-pot swirl injectors 400 on a fourth row, and one multi-pot swirl injector 400N on a fifth and final row, for a total of twelve multi-pot swirl injectors 400 and one pilot 500. In an alternative embodiment, pilot 500 may be replaced with a multi-pot swirl injector 400 and/or one or more multi-pot swirl injectors 400 may be replaced with a pilot 500. Each pilot 500 may be a lean direct injection (LDI) injector.

In the arrangement of FIG. 5B, a plurality of multi-pot swirl injectors 400 are arranged in a figure-eight pattern around two pilots 500A and 500B. In particular, six multi-pot swirl injectors 400 are arranged around first pilot 500A at the vertices of a first regular hexagon. Similarly, six multi-pot swirl injectors 400 are arranged around second pilot 500B, which is radially inward from first pilot 500A, at the vertices of a second regular hexagon. The second regular hexagon overlaps the first regular hexagon, such that both the first and second regular hexagons share multi-pot swirl injectors 400E and 400F, for a total of ten multi-pot swirl injectors 400. In an alternative embodiment, pilot 500A and/or 500B may be replaced with a multi-pot swirl injector 400 and/or one or more multi-pot swirl injectors 400 may be replaced with a pilot 500. Each pilot 500 may be an LDI injector.

The disclosed embodiments are illustrated with certain numbers of multi-pot swirl injectors 400. However, it should be understood that there may be fewer or more multi-pot swirl injectors 400 per fuel injector 134 than those illustrated. Furthermore, the arrangement of multi-pot swirl injectors 400 may differ from the illustrated arrangements. The precise arrangement and number of multi-pot swirl injectors 400 will depend on the design objectives for a given implementation.

Figure 6:
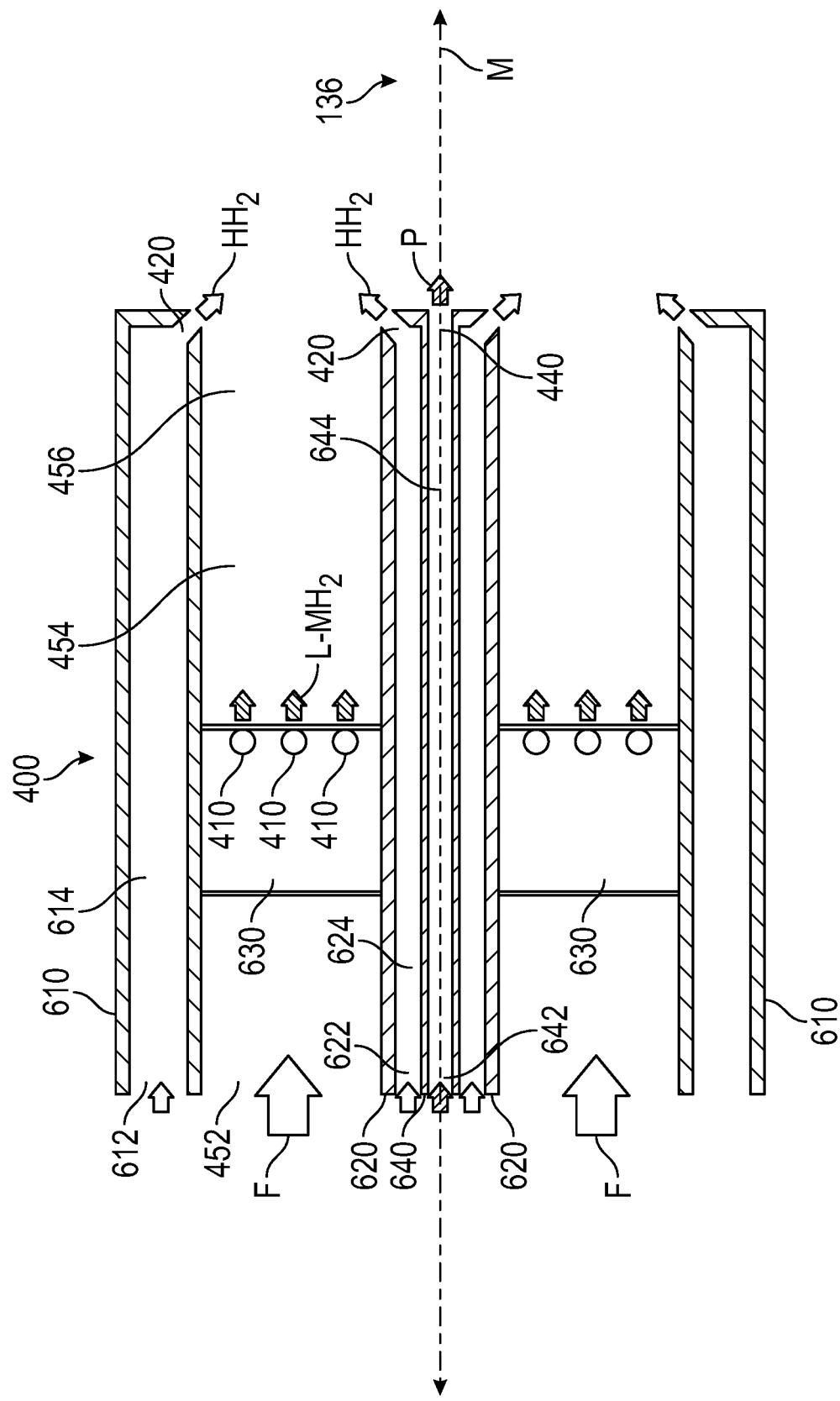
FIG. 6 illustrates a cross-sectional view of a multi-pot swirl injector, according to a first embodiment.
Figure 7:
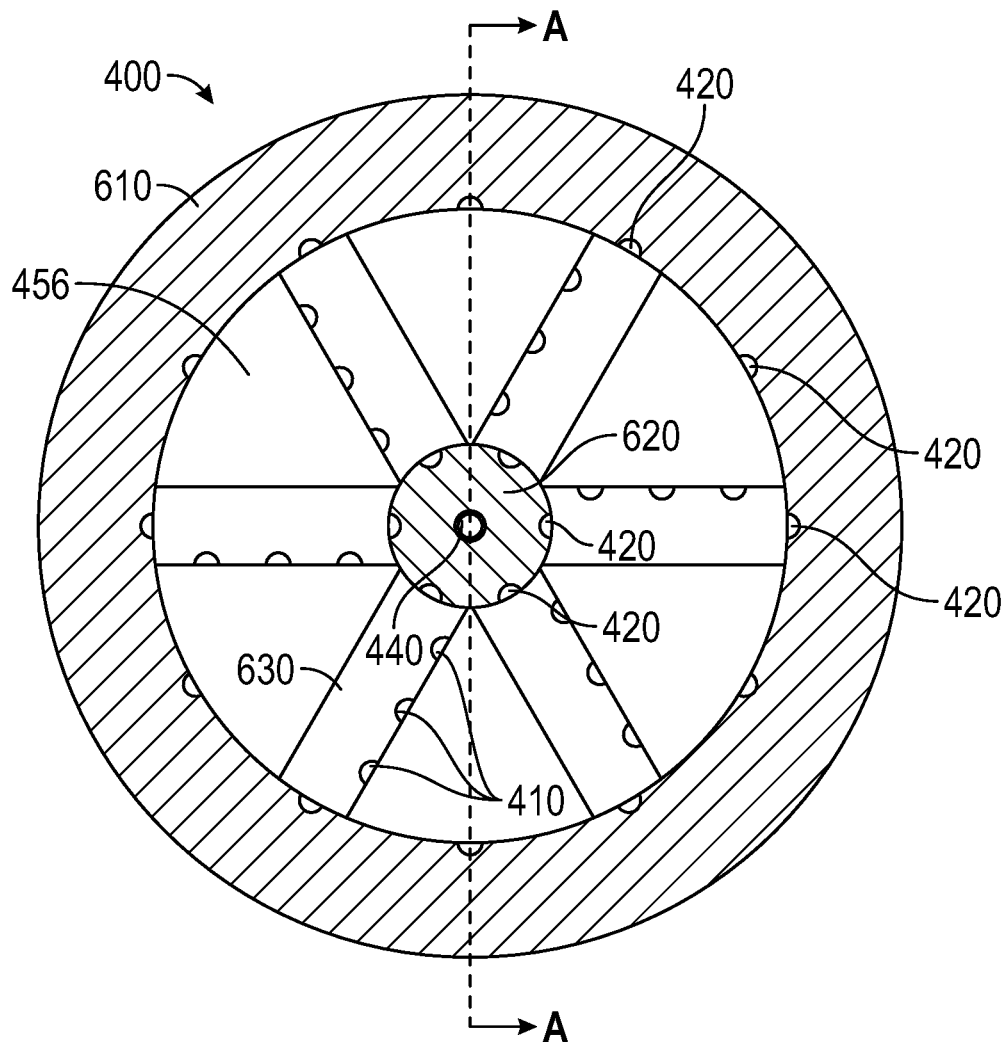
FIG. 7 illustrates a front view of a multi-pot swirl injector, according to the first embodiment.

FIG. 6 illustrates a cross-sectional view of a multi-pot swirl injector 400, cut along the plane A-A in FIG. 7, according to a first embodiment. In this first embodiment, multi-pot swirl injector 400 comprises an outer body 610 and an inner body 620. Outer body 610 and inner body 620 may be cylindrical and concentric around a common longitudinal axis M of multi-pot swirl injector 400, with inner body 620 nested within outer body 610. The inner diameter of outer body 610 may be greater than the outer diameter of inner body 620, such that an annular channel 454 is defined between the inner surface of outer body 610 and the outer surface of inner body 620.

Annular channel 454 defines a flow path for working fluid F from an inlet 452 to an outlet 456 of multi-pot swirl injector 400. Inlet 452 is in fluid communication with a supply of working fluid F, which may comprise or consist of air output by compressor 120. Working fluid F flows from inlet 452 through channel 454 and exits outlet 456 into combustion chamber 136.

Outer body 610 may comprise an internal channel 614. Channel 614 may be an annular channel between a radially inner annular wall and radially outer annular wall of outer body 610. Channel 614 may define a flow path for $HH_2$ fuel from an inlet 612 to one or more micromix jets 420. In other words, channel 614 provides fluid communication between inlet 612 and micromix jet(s) 420. In an embodiment, outer body 610 comprises a plurality of micromix jets 420 circumferentially arranged, at equidistant intervals, through the radially inner wall of an aft portion of outer body 610 and/or the downstream end of outer body 610. Each micromix jet 420 may comprise an aperture from channel 614 through the wall of outer body 610. The profile of the aperture may be circular or otherwise elliptical, square or otherwise rectangular, or the like.

In an embodiment, inlet 612 is in fluid communication with a supply of natural gas containing a high concentration of hydrogen, such as $HH_2$ fuel. This fuel flows from inlet 612 through channel 614 to micromix jet(s) 420. Each micromix jet 420 in outer body 610 is configured to inject the fuel into the flow path defined by channel 454 at a position closer to outlet 456 than to inlet 452. The position of injection by micromix jet(s) 420 into the flow path of channel 454 may be slightly upstream from outlet 456, at outlet 456, or slightly downstream from outlet 456. Each micromix jet 420 may inject fuel $HH_2$ at an angle into the flow path of working fluid F through channel 454. The angle of injection, relative to channel 454, may be any suitable angle between 0 degrees (i.e., parallel to channel 454) and 90 degrees (i.e., perpendicular to channel 454), and may be angled upstream or downstream.

Inner body 620 may comprise an internal channel 624. Channel 624 may be an annular channel between a central body 640 and a radially outer wall of inner body 620. Channel 624 may define a flow path for $HH_2$ fuel from an inlet 622 to one or more micromix jets 420. In other words, channel 624 provides fluid communication between inlet 622 and micromix jet(s) 420. In an embodiment, inner body 620 comprises a plurality of micromix jets 420 circumferentially arranged, at equidistant intervals, through the radially outer wall of an aft portion of inner body 620 and/or the downstream end of inner body 620. Each micromix jet 420 may comprise an aperture from channel 624 through the wall of inner body 620. The profile of the aperture may be circular or otherwise elliptical, square or otherwise rectangular, or the like.

In an embodiment, inlet 622 is in fluid communication with a supply of natural gas containing a high concentration of hydrogen, such as $HH_2$ fuel. The fuel flows from inlet 622 through channel 624 to micromix jet(s) 420. Each micromix jet 420 in inner body 620 is configured to inject fuel into the flow path defined by channel 454 at a position closer to outlet 456 than to inlet 452. The position of injection by micromix jet(s) 420 in inner body 420 may be slightly upstream from outlet 456, at outlet 456, or slightly downstream from outlet 456. Each micromix jet 420 may inject fuel $HH_2$ at an angle into the flow path of working fluid F through channel 454. The angle of injection, relative to channel 454, may be any suitable angle between 0 degrees (i.e., parallel to channel 454) and 90 degrees (i.e., perpendicular to channel 454), and may be angled upstream or downstream.

Notably, in an embodiment with outer body 610 and inner body 620, micromix jet(s) 420 may be divided into a first subset within outer body 610 and a second subset within inner body 620. Micromix jet(s) 420 in inner body 620 may be identical to micromix jet(s) 420 in outer body 610, except that micromix jet(s) 420 in inner body 610 may be angled radially inward, whereas micromix jet(s) 420 in inner body 620 may be angled radially outward. In other words, the dimensions, shapes, and/or angles of injection of each micromix jet 420 may be identical within each subset, as well as across subsets.

Like outer body 610 and inner body 620, central body 640 may be cylindrical and concentric around longitudinal axis M of multi-pot swirl injector 400. The outer diameter of central body 640 may be smaller than the inner diameter of inner body 620, such that the outer wall of inner body 620 and the outer wall of central body 640 define channel 624 in inner body 620.

Central body 640 may comprise an internal channel 644. Channel 644 may be a tubular channel defined by a cylindrical wall of central body 640. Central body 640 may define a flow path for pilot fuel from an inlet 642 to a pilot jet 440. In an embodiment, central body 640 consists of a single axial pilot jet 440 through the center of the aft end of central body 640, along longitudinal axis M of multi-pot swirl injector 400. In an alternative embodiment, central body 640 may comprise a plurality of axial pilot jets 440 that are arranged through the aft end of central body 640, around longitudinal axis M of multi-pot swirl injector 400 with flow paths parallel to longitudinal axis M.

In an embodiment, inlet 642 is in fluid communication with a supply of pilot fuel. The pilot fuel flows from inlet 642 through channel 644 to pilot jet(s) 440. Each pilot jet 440 is configured to inject pilot fuel parallel to the flow path defined by channel 454. Each pilot jet 440 may eject pilot fuel into combustion chamber 136, for example, when igniting the hydrogen/natural gas/air mixture. Central body 640 allows multi-pot swirl injector 400 to operate with richer fuel, such that multi-pot swirl injector 400 can act as a pilot.

In an alternative embodiment, central body 640 may be omitted, such that multi-pot swirl injectors 400 do not include a pilot. In this case, a dedicated pilot 500 may be used within an arrangement of multi-pot swirl injectors 400, as illustrated, for example, in FIGS. 5A and 5B.

In an embodiment, one or a plurality of swirl vanes 630 extend radially across channel 454 and axially through at least a portion of channel 454. Each swirl vane 630 may comprise one or a plurality of premix jets 410. Although not shown, each premix jet 410 may be in fluid communication, via one or more internal channels, to a supply of natural gas containing a low-to-medium concentration of hydrogen, such as L-MH$_2$ fuel. Each premix jet 410 is configured to inject fuel into the flow path defined by channel 454 at a position closer to inlet 452 than to outlet 456. The position of injection by premix jet(s) 410 may be at inlet 452, or upstream from inlet 452 but well downstream from outlet 456. Premix jets 410 may be oriented axially (i.e., parallel to channel 454 and longitudinal axis M), perpendicularly to longitudinal axis M, or at any suitable angle between parallel and perpendicular.

FIG. 7 illustrates a front view of a multi-pot swirl injector 400, according to the first embodiment. It should be understood that this view looks down longitudinal axis M from the aft end of multi-pot swirl injector 400. In the illustrated embodiment, a plurality of micromix jets 420 are arranged circumferentially around the inner circumference of the aft end of outer body 610, and a plurality of micromix jets 420 are arranged circumferentially around the outer circumference of the aft end of inner body 620. A single pilot jet 440 is arranged axially through the aft end of central body 640. In addition, each swirl vane 630 comprises a plurality of premix jets 410 arranged on one side of swirl vane 630. It should be understood that these are simply examples and that alternative embodiments may comprise different arrangements, positions, and/or numbers of jets 410, 420, and/or 440.

Inner body 620 may function as a bluff body flame stabilizer. In an alternative embodiment, inner body 620 and central body 640 could both be omitted, such that the cross section of channel 454 extends across the entire inner diameter of outer body 610. Such an embodiment would eliminate the low-pressure surface, along inner body 620, for swirled flows. This low-pressure surface provides a thick, weakly attached boundary layer, which is a prime flashback path. However, the omission of these interior bodies may result in a velocity deficit in the center of outlet 456, which can provide a flashback path, due to combustion-induced vortex breakdown (CIVB). Combustion-induced vortex breakdown can be countered by providing a path for unswirled gas along longitudinal axis M.

Figure 8:
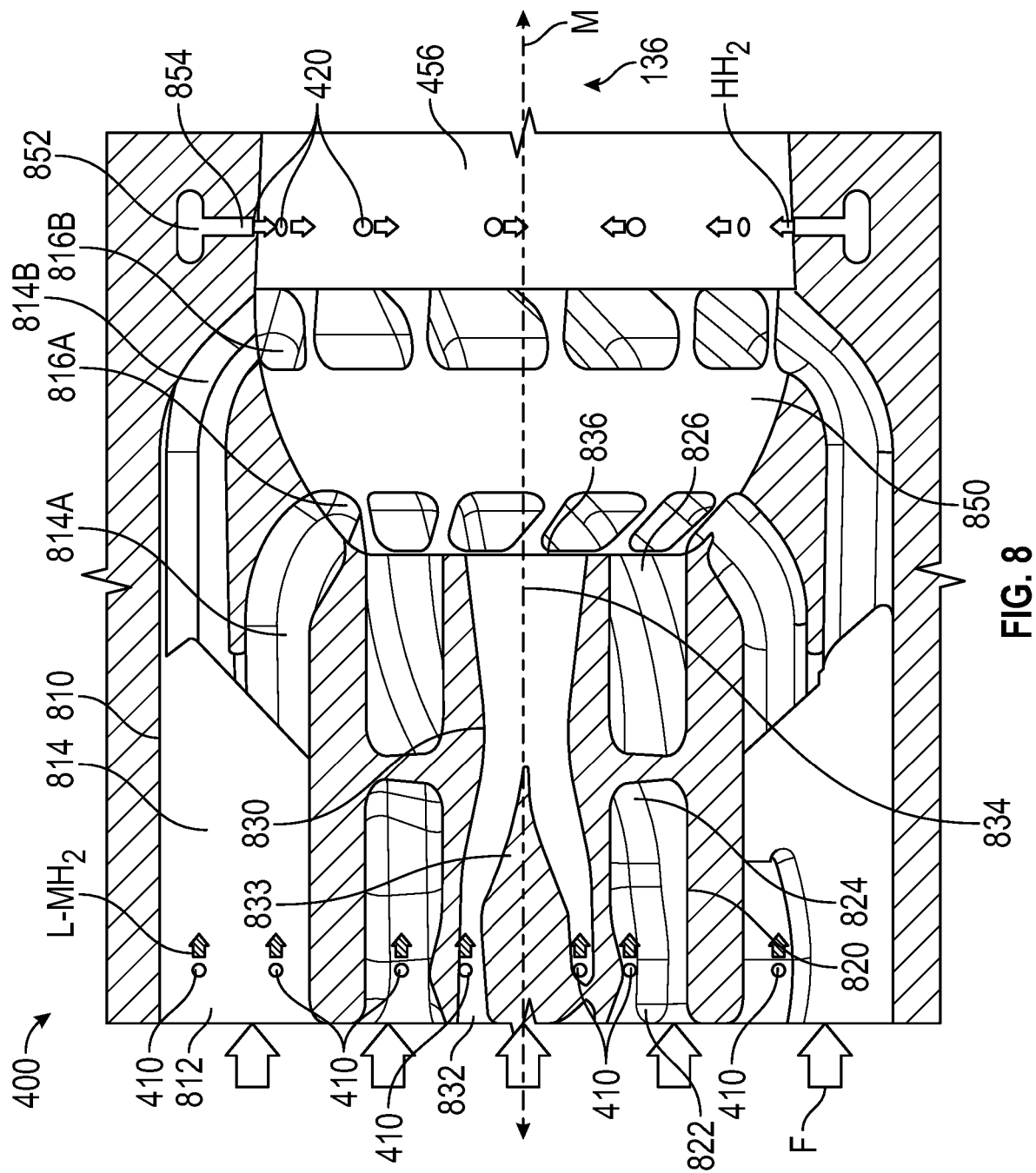
FIG. 8 illustrates a cross-sectional view of a multi-pot swirl injector, according to a second embodiment.
Figure 9:
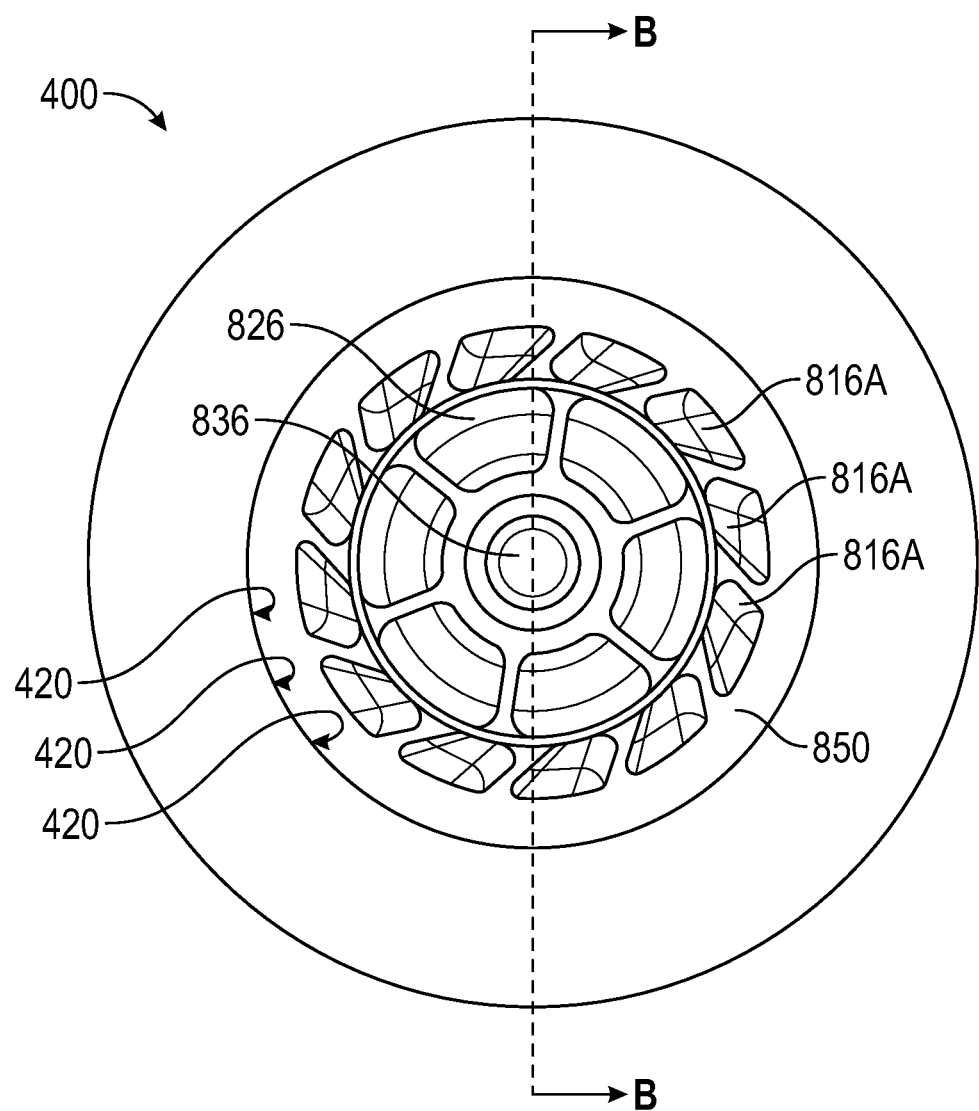
FIG. 9 illustrates a front view of a multi-pot swirl injector, according to the second embodiment.

FIG. 8 illustrates a cross-sectional view of a multi-pot swirl injector 400, cut along the plane B-B in FIG. 9, according to a second embodiment. This second embodiment is an example of a multi-pot swirl injector 400 with a central path for unswirled gas to counter combustion-induced vortex breakdown. In the second embodiment, multi-pot swirl injector 400 comprises a body with a radial swirler 810, an axial swirler 820, and a central path 830. In an alternative embodiment, one or more of radial swirler 810, axial swirler 820, and central path 830 may be omitted.

Radial swirler 810 may comprise an inlet 812. Inlet 812 may divide into one or a plurality of channels 814, which are illustrated as two channels 814A and 814B. Each channel 814 may swirl working fluid F around longitudinal axis M, and may end in an outlet 816. For example, channel 814A provides a swirled flow path between inlet 812 and outlet 816A, and channel 814B provides a swirled flow path between inlet 812 and outlet 816B. Notably, the swirled flow paths through outlets 816 enter a chamber 850 of multi-pot swirl injector 400 at an angle with respect to longitudinal axis M of multi-pot swirl injector 400. This angle could be, but is not necessarily, radial (i.e., 90 degrees with respect to longitudinal axis M). In an embodiment, the forward portions of channels 814 may extend axially, and the aft portions of channels 814 may turn from this axial orientation to a substantially radial orientation and enter chamber 850 along a substantially radial axis. In any case, swirler 810 is referred to herein as a "radial swirler," since the velocity of the flow of gas out of each outlet 816 has a radially inward component.

Radial swirler 810 encircles an axial swirler 820. Axial swirler 820 may comprise an inlet 822 that is in fluid communication with a channel 824. Channel 824 may swirl working fluid F around longitudinal axis M, and may end in an outlet 826. Channel 824 provides a swirled flow path between inlet 822 and outlet 826. Notably, the swirled flow path through outlet 826 connects axially (e.g., substantially parallel to longitudinal axis M) to chamber 850. Thus, swirler 820 is referred to herein as an "axial swirler." The various swirlers described herein, whether radial (e.g., radial swirler 810) or axial (e.g., axial swirler 820), may be co-rotating or counter-rotating. In addition, adjacent multi-pot swirl injectors 400, within the same array, may themselves rotate in opposite directions. Pilot(s) 500 may or may not incorporate a swirl.

Axial swirler 820 encircles a central path 830. Central path 830 may comprise an inlet 832, which may be annular around a central divider 833 to prevent oscillations. Inlet 832 converges into a channel 834 which ends in an outlet 836. Channel 834 provides an unswirled flow path for working fluid F between inlet 832 and outlet 836. The unswirled flow path through outlet 836 connects axially to chamber 850 and includes longitudinal axis M.

Each of radial swirler 810, axial swirler 820, and central path 830 channels working fluid F, such as air, into chamber 850. Radial swirler 810 swirls working fluid F through channel(s) 814 and injects the swirled air radially into chamber 850 through outlets 816 at one or more axial positions. For example, in the illustrated embodiment, working fluid F is injected through outlets 816A at one axial position and outlets 816B at another axial position that is downstream from outlets 816A. Thus, in an embodiment, a first subset of the plurality of swirled flow paths from radial swirler 810 connect to chamber 850 at a different axial position than a second subset of the plurality of swirled flow paths from radial swirler 810. Axial swirler 820 swirls working fluid F through channel 824 and injects the swirled working fluid F axially into chamber 850. Central path 830 channels unswirled working fluid axially into chamber 850, which, as discussed above, may prevent combustion-induced vortex breakdown.

One or more, including potentially all, of radial swirler 810, axial swirler 820, and central path 830 may comprise one or more premix jets 410. Each premix jet 410 may be positioned at or near the respective inlet. For example, inlet 812 of radial swirler 810 may comprise one or a plurality of premix jets 410 arranged through the inner surface of inlet 812 and/or slightly downstream from inlet 812, inlet 822 of axial swirler 820 may comprise one or a plurality of premix jets 410 arranged through the inner surface of inlet 822 and/or slightly downstream from inlet 822, and/or inlet 832 of central path 830 may comprise one or a plurality of premix jets 410 arranged through the inner surface of inlet 832 or slightly downstream from inlet 832. In any case, premix jets 410 are configured to inject fuel, such as L-MH$_2$ fuel into the flow path of working fluid F, at a position that is closer to the inlets of multi-pot swirl injector 400 than to outlet 456 of multi-pot swirl injector 400, such that there is a sufficient axial length for the fuel to mix with working fluid F. Each premix jet 410 may comprise an aperture. The profile of the aperture may be circular or otherwise elliptical, square or otherwise rectangular, or the like. All premix jets 410 may have the same dimensions, or one or more premix jets 410 may have different dimensions than one or more other premix jets 410.

Although not shown, each premix jet 410 may be in fluid communication, via one or more internal channels, to a supply of L-MH$_2$ fuel. Thus, L-MH$_2$ fuel is injected into the flow path of working fluid F defined by channels 814, 824, and/or 834. Premix jets 410 may be oriented radially (i.e., perpendicularly to longitudinal axis M), or at any other suitable angle with respect to longitudinal axis M.

In an embodiment, chamber 850 may comprise a plurality of micromix jets 420. Each micromix jet 420 may be positioned slightly upstream from outlet 456 or at outlet 456, and configured to inject fuel slightly upstream from outlet 456, at outlet 456, or slightly downstream from outlet 456. Outlet 456 may open into combustion chamber 136. Micromix jets 420 may be arranged circumferentially around longitudinal axis M and through the inner surface of chamber 850 near or at outlet 456. Optionally, a first subset of micromix jets 420 may connect to chamber 850 at a different axial position than a second subsect of micromix jets 420. Each micromix jet 420 may comprise an aperture. The profile of the aperture may be circular or otherwise elliptical, square or otherwise rectangular, or the like. All micromix jets 420 may have the same dimensions, or one or more micromix jets 420 may have different dimensions than one or more other micromix jets 420.

Each micromix jet 420 may be in fluid communication, via one or more internal channels 854, to a supply chamber 852 of a fuel, such as HH$_2$ fuel. The fuel flows from supply chamber 852, through channels 854, and is injected by micromix jets 420 into the flow path of working fluid F through chamber 850. Micromix jets 420 may be radial (i.e., oriented perpendicularly to longitudinal axis M), or at any other suitable angle with respect to longitudinal axis M. As illustrated, the plurality of micromix jets 420 may be positioned within chamber 850 at a position that is downstream from a position of outlets 816, at which the swirled flow paths through radial swirler 810 connect radially to chamber 850.

FIG. 9 illustrates a front view of a multi-pot swirl injector 400, according to the second embodiment. Swirled working fluid F enters chamber 850 via outlets 816 of radial swirler 810 and outlets 826 of axial swirler 820. In addition, unswirled working fluid F enters chamber 850, along longitudinal axis M, via outlet 836 of central path 830. When premix jets 410 are utilized, working fluid F will be premixed with fuel (e.g., L-MH$_2$ fuel) before entering chamber 850. On the other hand, when micromix jets 420 are utilized, working fluid F will be mixed with fuel (e.g., HH$_2$ fuel) after entering chamber 850.

Figure 10:
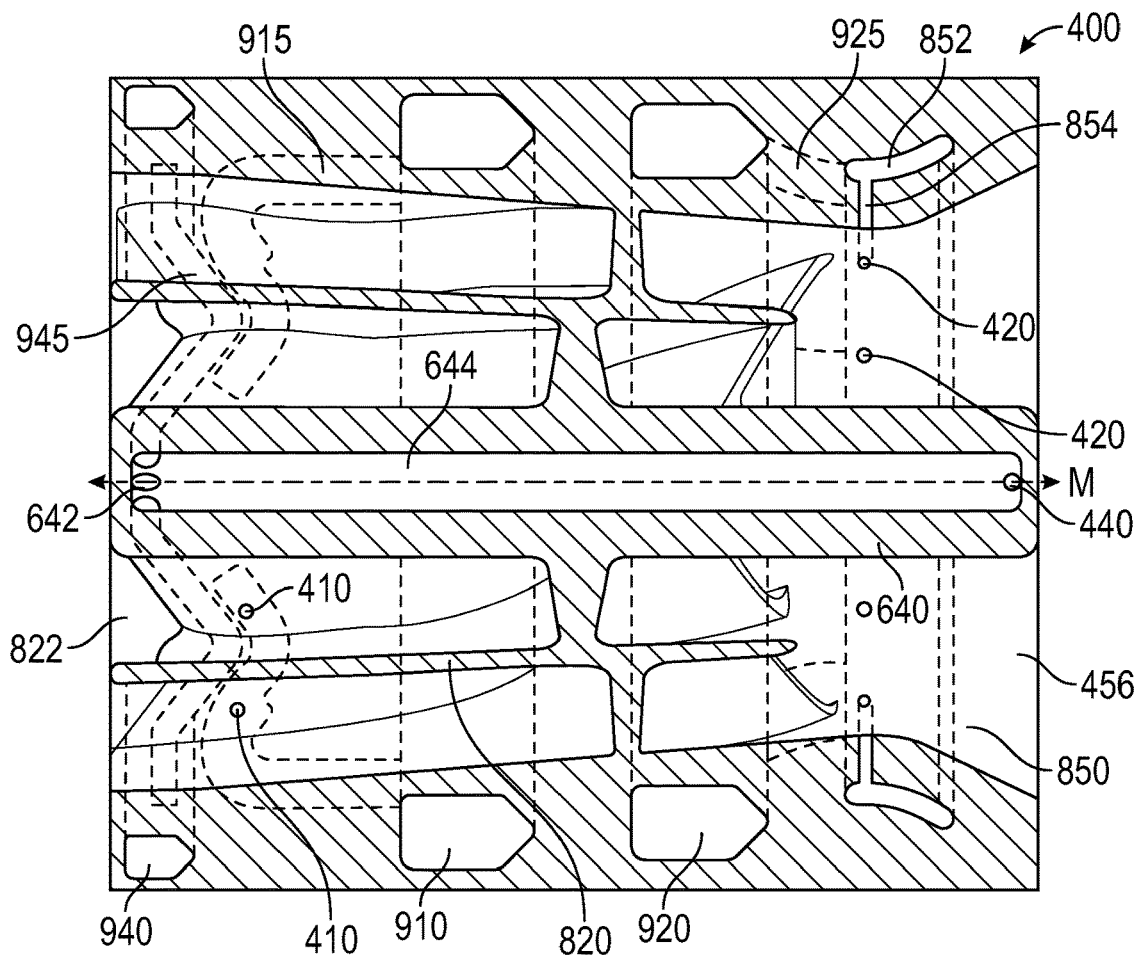
FIG. 10 illustrates a cross-sectional view of a multi-pot swirl injector, according to a third embodiment.

FIG. 10 illustrates a cross-sectional view of a multi-pot swirl injector 400, according to a third embodiment. This third embodiment combines features from the first and second embodiments. In particular, multi-pot swirl injector 400 comprises central body 640 with one or more pilot jets 440, an axial swirler 820 encircling central body 640, and a chamber 850. Premix jets 410 are positioned near inlet 822 of axial swirler 820, and micromix jets 420 and pilot jet(s) 440 are positioned in chamber 850.

An annular channel 910 around longitudinal axis M is in fluid communication with premix jets 410 via channels 915. Annular channel 910 may be connected to a supply of L-MH$_2$ fuel, such that L-MH$_2$ fuel flows around annular channel 910, through channels 915, and out of premix jets 410 into the swirled flow path through axial swirler 820. A plurality of channels 915 may be arranged circumferentially around longitudinal axis M, at equidistant intervals, and extend between annular channel 910 and one or a plurality of premix jets 410, such that each channel 915 connects annular channel 910 to a respective set of one or more premix jets 410.

An annular channel 920 around longitudinal axis M is in fluid communication with micromix jets 420 via channels 925, supply chamber 852, and channels 854. Annular channel 920 may be connected to a supply of HH$_2$ fuel, such that HH$_2$ fuel flows around annular channel 920, through channels 925, around supply chamber 852, through channels 854, and out of micromix jets 420. A plurality of channels 925 may be arranged circumferentially around longitudinal axis M, at equidistant intervals, and extend between annular channel 920 and supply chamber 852, such that each channel 925 connects annular channel 920 to supply chamber 852. In addition, a plurality of channels 854 may be arranged circumferentially around longitudinal axis M, at equidistant intervals, and extend between supply chamber 852 and micromix jets 420, such that each channel 854 connects supply chamber 852 to a respective one of micromix jets 420.

An annular channel 940 around longitudinal axis M is in fluid communication with inlets 642 via channels 945. Annular channel 940 may be connected to a supply of pilot fuel, such that pilot fuel flows around annular channel 940, through channels 945, through outlets 642, through channel 644, and out of pilot jet(s) 440. A plurality of channels 945 may be arranged circumferentially around longitudinal axis M, at equidistant intervals, and extend between annular channel 940 and central body 640, such that each channel 945 connects annular channel 940 to a respective one of a plurality of inlets 642 in central body 640. Each inlet 642 may be a radial aperture through the circumferential wall of central body 640. In an embodiment, a plurality of pilot jets 440 may be arranged circumferentially around the outer circumference of the aft portion of central body 640, to inject the pilot fuel into chamber 850, at or near outlet 456 of chamber 850.

Multi-pot swirl injector 400, whether implemented according to the first, second, or third embodiment, may be operated in at least two modes. In a first mode, multi-pot swirl injector 400 is operated as a premixed fuel injector by supplying fuel to premix jets 410, such that fuel is injected into working fluid F by premix jets 410, and not supplying fuel to micromix jets 420. In a second mode, multi-pot swirl injector 400 is operated as a micromixer by supplying fuel to micromix jets 420, such that fuel is injected into working fluid F by micromix jets 420, and not supplying fuel to premix jets 410. The supply of fuel to the respective jets may be toggled on and off (e.g., via one or more valves or other mechanisms). Unused fuel paths may be purged with working fluid F from compressor 120, to create a purge flow that prevents coking and potential flame egress.

Generally, premix jets 410 are positioned at or near inlet(s) (e.g., 452, 812, 822, 832) of multi-pot swirl injector 400 and upstream from outlet 456 of multi-pot swirl injector 400, whereas micromix jets 420 are positioned at or near outlet 456 of multi-pot swirl injector 400 and downstream from the inlet(s) (e.g., 452, 812, 822, 832) of multi-pot swirl injector 400. In all cases, premix jets 410 are positioned upstream from micromix jets 420. Thus, premix jets 410 introduce a hydrogen/natural gas fuel (e.g., L-MH$_2$ fuel, representing Regimes I and II) well before outlet 456, such that there is sufficient axial length and residence time for the fuel to mix with working fluid F (e.g., air) before reaching outlet 456. In contrast, micromix jets 420 are positioned downstream from premix jets 410 and near outlet 456. Thus, micromix jets 420 introduce a hydrogen/natural gas fuel (e.g., $HH_2$ fuel, representing Regime III) near outlet 456 to produce many, small, isolated diffusion flames.

In an embodiment, the swirl number for swirler 630 or radial swirler 810 and/or axial swirler 820 may be greater than 0.6, to minimize turbulence in the micromix mode. A swirl number greater than 0.6 is sufficient to induce the formation of the inner and outer recirculation zones required for swirl stabilization and re-light.

In an embodiment, each micromix jet 420 is separated by any adjacent micromix jets 420 by a distance that is at least 8 to 10 times the diameter of micromix jet 420. The diameter of each micromix jet 420 may be greater than 0.5 millimeters, and preferably less than 0.75 millimeters, to enable low NOx emissions, while preventing micromix jet 420 from becoming plugged with dirt or other build-up.

In an embodiment, multi-pot swirl injectors 400 may be divided into different subsets within the same fuel injector 134 and/or across different fuel injectors 134. Each subset of multi-pot swirl injectors 400 may be supplied by different fuel supply systems, such that each subset of multi-pot swirl injectors 400 can be controlled independently of other subsets of multi-pot swirl injectors 400. Subsets of pilots 500 may be independently controlled in a similar manner. This enables fuel staging to be performed with different groupings of multi-pot swirl injectors 400 and/or pilots 500.

Figure 11:
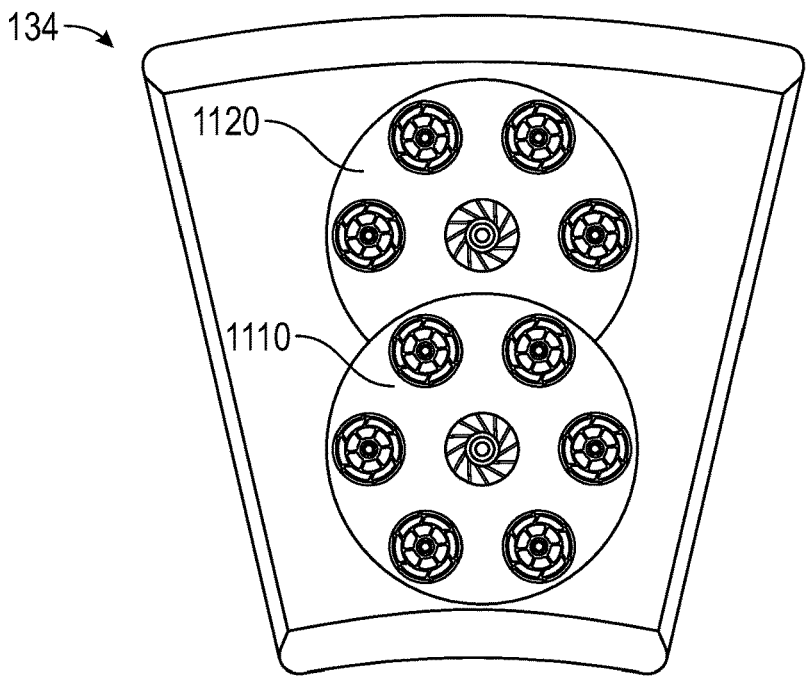
FIG. 11 illustrates staged combustion, according to an embodiment.

FIG. 11 illustrates staged combustion, which may be implemented in combustor 130, according to an embodiment. In this embodiment, combustor 130 comprises at least a first stage 1110 and a second stage 1120. First stage 1110 may comprise one or more pilots 500 and/or a first subset of one or more multi-pot swirl injectors 400 (e.g., one pilot 500 and a plurality of multi-pot swirl injectors 400 at least partially surrounding pilot 500) that may be used for combustion. Second stage 1120 may also comprise one or more pilots 500 and/or a second subset of multi-pot swirl injectors 400 (e.g., one pilot 500 and a plurality of multi-pot swirl injectors 400 at least partially surrounding pilot 500) that may also be used for combustion. First stage 1110 and second stage 1120 may be configured to operate independent from each other.

As illustrated, first stage 1110 and second stage 1120 may be arranged within the same fuel injector 134. The first subset may be distinct from the second subset or may overlap with the second subset. Pilots 500 may be LDI pilots or pilots with similarly wide operability. The purpose of first stage 1110 is to provide stable baseline energy to turbine 140. The second stage 1120 may have multiple purposes. For instance, second stage 1120 may be used to extend the load range of gas turbine engine 100, accommodate a wide range of fuel mixtures, control instabilities, and/or the like, including any combination of these purposes. First stage 1110 may remain always active, while second stage 1120 may be activated as needed.

FIG. 11 illustrates radially staged combustion. Radial staging may be used to extend the operating range of gas turbine engine 100 beyond what can be achieved with a single stage. Additionally or alternatively, another form of staging can be used to aid in matching the load requirements of gas turbine engine 100, such as axial staging, another form of radial staging, or a hybrid of axial and radial staging.

INDUSTRIAL APPLICABILITY

For hydrogen/natural gas mixtures of Regime I (i.e., 0-30% $H_2$ by volume) and a portion of Regime II (e.g., potentially up to 60% $H_2$ by volume), premixed, swirl-stabilized dump-style fuel injectors work well. However, such fuel injectors are subject to flashback for mixtures with higher hydrogen concentrations. For hydrogen/natural gas mixtures of Regime III (i.e., greater than 70% $H_2$ by volume), micromix fuel injectors work well to prevent flashbacks. Micromix fuel injectors are non-premixed fuel injectors that are designed to produce many very short diffusion flames. The short residence time of the flame at high temperatures minimizes the production of nitrogen oxides (NOx). However, micromix fuel injectors are unable to operate at lower hydrogen concentrations. For example, the high air velocity required to prevent a pure hydrogen flame from attaching to the injector is likely too high to support a pure natural gas flame, which would simply blow off. In addition, to achieve low NOx emissions, the flames of a micromix fuel injector need to be subjected to minimal turbulence, whereas a premix fuel injector requires strong mixing. A swirled flow can provide this mixing and establish recirculation zones that feed hot combustion products into the base of the flame, thereby aiding in flame stability.

Advantageously, disclosed embodiments represent a multi-pot swirl injector 400 that is able to operate for hydrogen/natural gas mixtures with both low and high hydrogen concentrations (i.e., in both Regime I and Regime III). In other words, multi-pot swirl injector 400 represents a hybrid, all-in-one injector that is capable of operating over the full range of hydrogen/natural gas mixtures, from pure natural gas to pure hydrogen.

Multi-pot swirl injector 400 is configured for operation in at least two modes. In a premix mode, fuel with lower hydrogen concentrations (e.g., L-$MH_2$ in Regime I or II) may be injected into working fluid F via premix jets 410 which are sufficiently upstream from outlet 456 to allow premixing of the fuel with working fluid F. In a micromix mode, fuel with higher hydrogen concentrations (e.g., $HH_2$ in Regime III) may be injected into working fluid F via micromix jets 420, which are near or at outlet 456, to produce many short diffusion flames for lowering the production of NOx.

Premix jets 410 and micromix jets 420 may be connected to respective fuel supply systems that can be turned on or off, depending on the mode of operation. For example, a first fuel supply system for fuel with lower hydrogen concentrations and connected to premix jets 410 may be turned on, while a second fuel supply system for fuel with higher hydrogen concentrations and connected to micromix jets 420 is turned off, to implement the premix mode. Conversely, the first fuel supply system may be turned off, while the second fuel supply system is turned on, to implement the micromix mode. Thus, the operator may operate gas turbine engine 100 in the appropriate mode using the same fuel injectors 134 (i.e., without having to switch out fuel injectors).

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of fuel injection system. Hence, although the present embodiments are, for convenience of explanation, depicted and described as being implemented in a gas turbine engine, it will be appreciated that it can be implemented in various other types of engines and machines with fuel injectors, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A fuel injector comprising:
   at least one channel defining a flow path for gas from an inlet to an outlet, wherein the at least one channel comprises a central path between the inlet and a chamber that includes the outlet, wherein the central path defines an unswirled flow path that connects axially to the chamber;
   an axial swirler between the inlet and the chamber, wherein the axial swirler encircles the central path and defines a swirled flow path that connects axially to the chamber;
   a plurality of premix jets configured to inject fuel into the flow path at a position closer to the inlet than to the outlet, wherein the plurality of premix jets is configured to be supplied with a first fuel; and
   a plurality of micromix jets configured to inject fuel into the flow path at a position closer to the outlet than to the inlet to produce a plurality of diffusion flames during operation of the fuel injector, wherein the plurality of micromix jets is configured to be supplied with a second fuel,
   wherein the fuel injector is configured to:
      in a premix mode, supply the first fuel to the premix jets, such that the first fuel is injected into the flow path via the plurality of premix jets, while not supplying fuel to the plurality of micromix jets, and
      in a micromix mode, supply the second fuel to the micromix jets, such that the second fuel is injected into the flow path via the plurality of micromix jets, while not supplying fuel to the plurality of premix jets.

2. The fuel injector of claim 1, wherein the first fuel is a hydrogen/natural gas mixture with less than 70% hydrogen by volume, wherein the second fuel is a hydrogen/natural gas mixture with greater than 50% hydrogen by volume, wherein the plurality of premix jets is in fluid communication with a first fuel supply system for the first fuel, wherein the plurality of micromix jets is in fluid communication with a second fuel supply system for the second fuel, and wherein the second fuel supply system is different from the first fuel supply system.

3. The fuel injector of claim 1, further comprising an outer body, wherein the at least one channel is formed within the outer body, and wherein the outer body comprises at least a first subset of the plurality of micromix jets.

4. The fuel injector of claim 3, wherein the at least the first subset of the plurality of micromix jets extend through a radially inner wall of an aft portion of the outer body.

5. The fuel injector of claim 4, wherein the at least the first subset of the plurality of micromix jets are circumferentially arranged around the aft portion of the outer body at equidistant intervals.

6. The fuel injector of claim 3, further comprising a swirler within the at least one channel, wherein the swirler comprises the plurality of premix jets.

7. The fuel injector of claim 3, further comprising an inner body within and concentric with the outer body, so as to define the at least one channel between the outer body and the inner body.

8. The fuel injector of claim 7, wherein the inner body comprises a second subset of the plurality of micromix jets.

9. The fuel injector of claim 8, wherein the second subset of the plurality of micromix jets extend through a radially outer wall of an aft portion of the inner body.

10. The fuel injector of claim 9, wherein the second subset of the plurality of micromix jets are circumferentially arranged around the aft portion of the inner body at equidistant intervals.

11. The fuel injector of claim 7, further comprising a swirler extending between the outer body and the inner body within the at least one channel, wherein the swirler includes the plurality of premix jets.

12. The fuel injector of claim 7, further comprising a central body within and concentric with the inner body, wherein the central body comprises at least one pilot jet through an aft end of the central body.

13. The fuel injector of claim 1, wherein the at least one channel further comprises a radial swirler between the inlet and the chamber, wherein the radial swirler encircles the axial swirler and defines at least one swirled flow path that connects radially to the chamber, wherein the plurality of premix jets are positioned within one or more of the central path, the axial swirler, or the radial swirler, and wherein the plurality of micromix jets are positioned within the chamber at a position that is downstream from a position at which the at least one swirled flow path connects radially to the chamber.

14. The fuel injector of claim 1, wherein the plurality of premix jets are positioned within one or both of the central path and the axial swirler, and wherein the plurality of micromix jets are positioned within the chamber.

15. A fuel injector comprising a plurality of multi-pot swirl injectors, wherein each of the plurality of multi-pot swirl injectors includes:
   at least one channel defining a flow path for gas from an inlet to an outlet, wherein the at least one channel comprises a central path between the inlet and a chamber that includes the outlet, wherein the central path defines an unswirled flow path that connects axially to the chamber;
   an axial swirler between the inlet and the chamber, wherein the axial swirler encircles the central path and defines a swirled flow path that connects axially to the chamber;
   a second swirler within the at least one channel, wherein the second swirler comprises a plurality of premix jets configured to inject fuel into the flow path at a position closer to the inlet than to the outlet, wherein the plurality of premix jets is configured to be supplied with a first fuel having less than 70% hydrogen by volume; and
   a plurality of micromix jets configured to inject fuel into the flow path at a position closer to the outlet than to the inlet to produce a plurality of diffusion flames during operation of the fuel injector wherein the plurality of micromix jets is configured to be supplied with a second fuel having greater than 50% hydrogen by volume,
   wherein the fuel injector is configured to:

in a premix mode, supply the first fuel to the premix jets, such that the first fuel is injected into the flow path via the plurality of premix jets, while not supplying fuel to the plurality of micromix jets, and in a micromix mode, supply the second fuel to the micromix jets, such that the second fuel is injected into the flow path via the plurality of micromix jets, while not supplying fuel to the plurality of premix jets.

16. The fuel injector of claim 15, wherein the plurality of multi-pot swirl injectors comprise a central multi-pot swirl injector positioned in a center of the fuel injector and others of the plurality of multi-pot swirl injectors encircling the central multi-pot swirl injector in one or more concentric rings.

17. The fuel injector of claim 16, wherein the one or more concentric rings comprise at least one ring in which at least a subset of the others of the plurality of multi-pot swirl injectors are positioned at the vertices of either a regular pentagon or a regular hexagon, centered at a position of the central multi-pot swirl injector.

18. A gas turbine engine comprising:

a compressor;

a combustor downstream from the compressor, wherein the combustor comprises a plurality of fuel injectors, wherein each of the plurality of fuel injectors comprises a plurality of multi-pot swirl injectors, and wherein each multi-pot swirl injector comprises:

at least one channel defining a flow path for gas from an inlet to an outlet, wherein the at least one channel comprises a central path between the inlet and a chamber that includes the outlet, wherein the central path defines an unswirled flow path that connects axially to the chamber;

an axial swirler between the inlet and the chamber, wherein the axial swirler encircles the central path and defines a swirled flow path that connects axially to the chamber;

a plurality of premix jets configured to inject fuel into the flow path at a position closer to the inlet than to the outlet, wherein the plurality of premix jets is configured to be supplied with a first fuel having less than 70% hydrogen by volume, and a plurality of micromix jets configured to inject fuel into the flow path at a position closer to the outlet than to the inlet to produce a plurality of diffusion flames during operation of the gas turbine engine wherein the plurality of micromix jets is configured to be supplied with a second fuel having greater than 50% hydrogen by volume, wherein the multi-pot swirl injector is configured to:

in a premix mode, supply the first fuel to the premix jets, such that the first fuel is injected into the flow path via the plurality of premix jets, while not supplying fuel to the plurality of micromix jets, and in a micromix mode, supply the second fuel to the micromix jets, such that the second fuel is injected into the flow path via the plurality of micromix jets, while not supplying fuel to the plurality of premix jets; and a turbine downstream from the combustor.

19. The gas turbine engine of claim 18, wherein each of the plurality of fuel injectors comprises a first stage, which includes a first subset of the plurality of multi-pot swirl injectors and at least one pilot, and a second stage, which includes a second subset of the plurality of multi-pot swirl injectors and at least one pilot, wherein the first stage and the second stage are configured to operate independently from each other.

* * * * *